United States Patent
Noh et al.

(10) Patent No.: US 9,425,936 B2
(45) Date of Patent: *Aug. 23, 2016

(54) METHOD AND APPARATUS FOR GENERATING A REFERENCE SIGNAL SEQUENCE IN A WIRELESS COMMUNICATION SYSTEM

(71) Applicant: LG ELECTRONICS INC., Seoul (KR)

(72) Inventors: Min Seok Noh, Anyang-si (KR); Jae Hoon Chung, Anyang-si (KR); Hyun Soo Ko, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,090

(22) Filed: Jun. 4, 2015

(65) Prior Publication Data

US 2015/0270938 A1 Sep. 24, 2015

Related U.S. Application Data

(63) Continuation of application No. 13/697,308, filed as application No. PCT/KR2011/003555 on May 13, 2011, now Pat. No. 9,065,585.

(60) Provisional application No. 61/334,555, filed on May 13, 2010.

(30) Foreign Application Priority Data

May 13, 2011 (KR) .................. 10-2011-0045104

(51) Int. Cl.
*H04Q 9/00* (2006.01)
*H04J 13/00* (2011.01)
(Continued)

(52) U.S. Cl.
CPC ......... *H04L 5/0048* (2013.01); *H04J 13/0074* (2013.01); *H04L 5/0012* (2013.01);
(Continued)

(58) Field of Classification Search
CPC .................. H04J 13/0062; H04J 13/0074
USPC .................. 370/312, 329; 375/141, 146
See application file for complete search history.

(56) References Cited

U.S. PATENT DOCUMENTS

| | | |
|---|---|---|
| 2008/0298433 A1 | 12/2008 | Tiirola et al. |
| 2009/0046645 A1 | 2/2009 | Bertrand et al. |

(Continued)

FOREIGN PATENT DOCUMENTS

| | | |
|---|---|---|
| EP | 2 523 378 A2 | 11/2012 |
| KR | 10-2009-0112534 A | 10/2009 |

(Continued)

OTHER PUBLICATIONS

Catt, "UL DMRS Design for LTE-A," 3GPP TSG RAN WG1 Meeting #60bis, R1-101772, Beijing, China, Apr. 12-16, 2010, 3 pages, XP-50419181A.

*Primary Examiner* — Wanda Z Russell
(74) *Attorney, Agent, or Firm* — Birch, Stewart, Kolasch & Birch, LLP

(57) ABSTRACT

A method and base station for receiving a reference signal in a wireless communication system are discussed. The method according to one embodiment includes transmitting a cell-specific group hopping parameter to a plurality of user equipments (UEs). The cell-specific group hopping parameter is used to disable a group hopping. The method according to the embodiment further includes transmitting a cell-specific sequence hopping parameter to the plurality of UEs. The cell-specific sequence hopping parameter is used to enable a sequence hopping. The method according to the embodiment further includes transmitting a UE-specific sequence group hopping (SGH) parameter to a certain UE. The UE-specific SGH parameter is used to disable the sequence hopping. The method according to the embodiment further includes receiving a reference signal, which is generated based on a base sequence number. The base sequence number within the base sequence group is determined by the UE-specific SGH parameter.

14 Claims, 16 Drawing Sheets

(51) Int. Cl.
*H04L 5/00* (2006.01)
*H04L 27/26* (2006.01)
*H04J 11/00* (2006.01)
*H04W 28/18* (2009.01)
*H04W 48/16* (2009.01)

(52) U.S. Cl.
CPC ........... *H04L5/0026* (2013.01); *H04L 5/0051* (2013.01); *H04L 27/2613* (2013.01); *H04J 11/005* (2013.01); *H04L 5/0007* (2013.01); *H04L 5/0037* (2013.01); *H04L 5/0082* (2013.01); *H04L 5/0092* (2013.01); *H04W 28/18* (2013.01); *H04W 48/16* (2013.01)

(56) References Cited

U.S. PATENT DOCUMENTS

| | | |
|---|---|---|
| 2009/0252260 A1 | 10/2009 | Noh et al. |
| 2011/0206089 A1* | 8/2011 | Cho ................. H04B 1/707 375/141 |
| 2012/0140717 A1 | 6/2012 | Zhu et al. |
| 2013/0121266 A1* | 5/2013 | Ko ................. H04J 13/0074 370/329 |
| 2013/0155992 A1 | 6/2013 | Yoon et al. |
| 2013/0201931 A1 | 8/2013 | Noh et al. |
| 2013/0279544 A1* | 10/2013 | Papasakellariou ..... H04B 1/707 375/146 |

FOREIGN PATENT DOCUMENTS

| | | |
|---|---|---|
| KR | 10-0939724 A | 2/2010 |
| KR | 10-2011-0081106 A | 7/2011 |
| KR | 10-2011-0125618 A | 11/2011 |
| KR | 10-2012-0023200 A | 3/2012 |
| KR | 10-1290196 B1 | 7/2013 |
| WO | WO 2011/023035 A1 | 3/2011 |
| WO | WO 2011/118938 A2 | 9/2011 |

* cited by examiner

FIG. 8
(a) 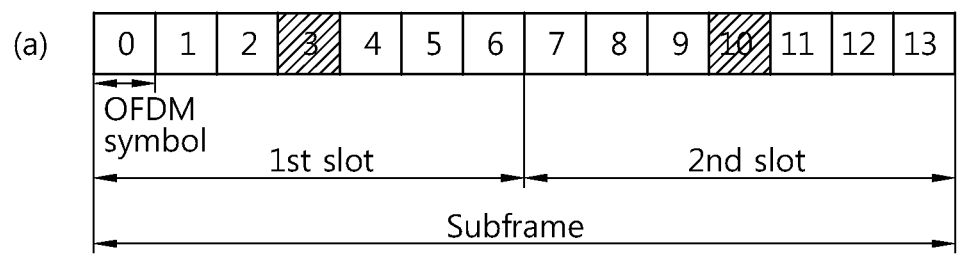
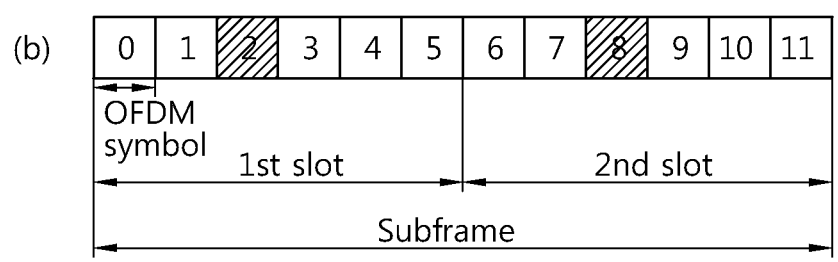
(b)

FIG. 13
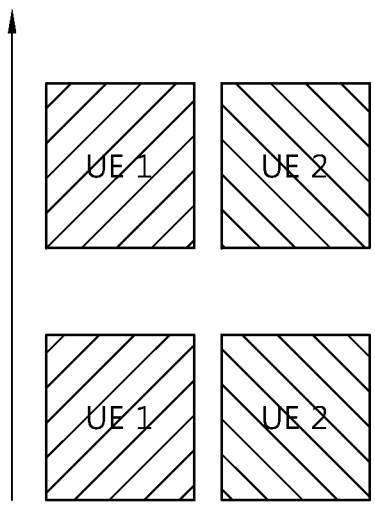
(a)
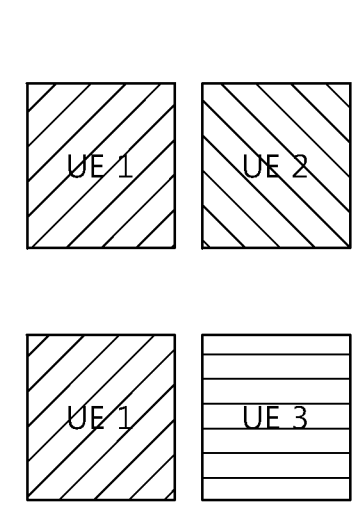
(b)

METHOD AND APPARATUS FOR GENERATING A REFERENCE SIGNAL SEQUENCE IN A WIRELESS COMMUNICATION SYSTEM

CROSS-REFERENCE TO RELATED APPLICATIONS

This application is a Continuation of co-pending application Ser. No. 13/697,308 filed on Jan. 4, 2013, which is a National Stage of PCT/KR2011/003555 filed on May 13, 2011, which claims the benefit of U.S. Provisional Application No. 61/334,555 filed on May 13, 2010, and which claims priority to Korean Application No. 10-2011-0045104 filed on May 13, 2011. The entire contents of each of these applications are hereby incorporated by reference.

BACKGROUND OF THE INVENTION

1. Field of the Invention

The present invention relates to a wireless communication and, more particularly, to a method and an apparatus for generating a reference signal sequence in a wireless communication system.

2. Discussion of the Related Art

Multiple-input multiple-output (MIMO) technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h} = y/p = h + n/p = h + \hat{n} \qquad \text{[Equation 1]}$$

The accuracy of the channel estimation value $\hat{h}$ estimated using the reference signal p is determined by the value $\hat{n}$. To accurately estimate the value h the value $\hat{n}$ must converge on 0. To this end, the influence of the value $\hat{n}$ has to be minimized by estimating a channel using a large number of reference signals. A variety of algorithms for a better channel estimation performance may exist.

In transmitting a reference signal, group hoping (GH) or sequence hopping (SH) may be applied to a reference signal sequence to minimize inter-cell interference (ICI).

In a multi-user (MU)-multiple-input multiple-output (MIMO) environment, an orthogonal covering code (OCC) may be applied to guarantee orthogonality between reference signals that a plurality of user equipments transmits. By applying the OCC, the enhancement of the orthogonality and throughput may be guaranteed. Meanwhile, a plurality of user equipments may use different bandwidths in the MU-MIMO environment. If the OCC is applied together while performing sequence hopping on reference signals that the plurality of user equipments transmits with different bandwidths, the complexity of cell planning increases. In other words, it is difficult to guarantee the orthogonality between the reference signals that the plurality of user equipments transmits.

Accordingly, another scheme is required to indicate whether to perform sequence hopping on a reference signal sequence.

SUMMARY OF THE INVENTION

The present invention provides a method and apparatus for generating a reference signal sequence in a wireless communication system.

In an aspect, a method of generating a reference signal sequence by a user equipment (UE) in a wireless communication system is provided. The method includes receiving a cell-specific sequence hopping parameter from a base station, receiving a UE-specific sequence group hopping (SGH) parameter that is specific to the UE, from the base station, and generating a reference signal sequence based on a base sequence number of a base sequence determined on a unit of each slot according to the cell-specific sequence hopping parameter and the UE-specific sequence group hopping parameter, wherein whether to apply a sequence hopping on the base sequence number indicated by the UE-specific sequence group hopping parameter overrides whether to apply the sequence hopping on the base sequence number indicated by the cell-specific sequence hopping parameter.

When that the sequence hopping is applied is indicated by the cell-specific sequence hopping parameter, and that the sequence hopping is not applied is indicated by the UE-specific sequence group hopping parameter, all the base sequence numbers of the base sequences determined on the unit of each slot may be the same.

All the sequence numbers of the base sequences may be zeros.

A value of the cell-specific sequence hopping parameter may be 1, and a value of the UE-specific sequence group hopping parameter may be 1.

The UE-specific sequence group hopping parameter may be transmitted through a higher layer.

The cell-specific sequence hopping parameter may be transmitted through a higher layer.

The base sequence number of the base sequence may be either 0 or 1.

The reference signal sequence may use physical uplink shared channel (PUSCH) resources and may be a demodulation reference signal (DMRS) sequence for demodulating a signal.

A length of the reference signal sequence may be larger than six times a size of a resource block (RB) in a frequency domain that is represented by a number of subcarriers.

The reference signal sequence may be generated by shifting the base sequence cyclically.

The method may further include receiving a cell-specific group hopping parameter from the base station, and the cell-specific group hopping parameter may indicate whether to apply a group hopping on a sequence group number of the base sequence determined on the unit of each slot.

That the group hoping to the sequence group number is not applied may be indicated by the cell-specific group hopping parameter.

The method may further includes mapping the reference signal sequence to a resource block that includes a plurality of subcarriers and transmitting the result to the base station.

In another aspect, a user equipment (UE) for a wireless communication system is provided. The UE includes a radio frequency (RF) unit configured for transmitting or receiving a radio signal, and a processor that is connected to the RF unit, and configured for receiving a cell-specific sequence hopping parameter from a base station, receiving a UE-specific sequence group hopping (SGH) parameter that is specific to the UE, from the base station, and generating a reference signal sequence based on a base sequence number of a base sequence determined on a unit of each slot according to the cell-specific sequence hopping parameter and the UE-specific sequence group hopping parameter, wherein whether to apply a sequence hopping on the base sequence number indicated by the UE-specific sequence group hopping parameter overrides whether to apply the sequence hopping on the base sequence number indicated by the cell-specific sequence hopping parameter.

The invention may guarantee the orthogonality between a plurality of user equipments that use different bandwidths in an MU-MIMO environment.

BRIEF DESCRIPTION OF THE DRAWINGS

FIG. 8 shows an example of the structure of a reference signal transmitter for demodulation.

FIG. 13 is an example where a plurality of UEs performs MU-MIMO transmission using different bandwidths.

DETAILED DESCRIPTION OF THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
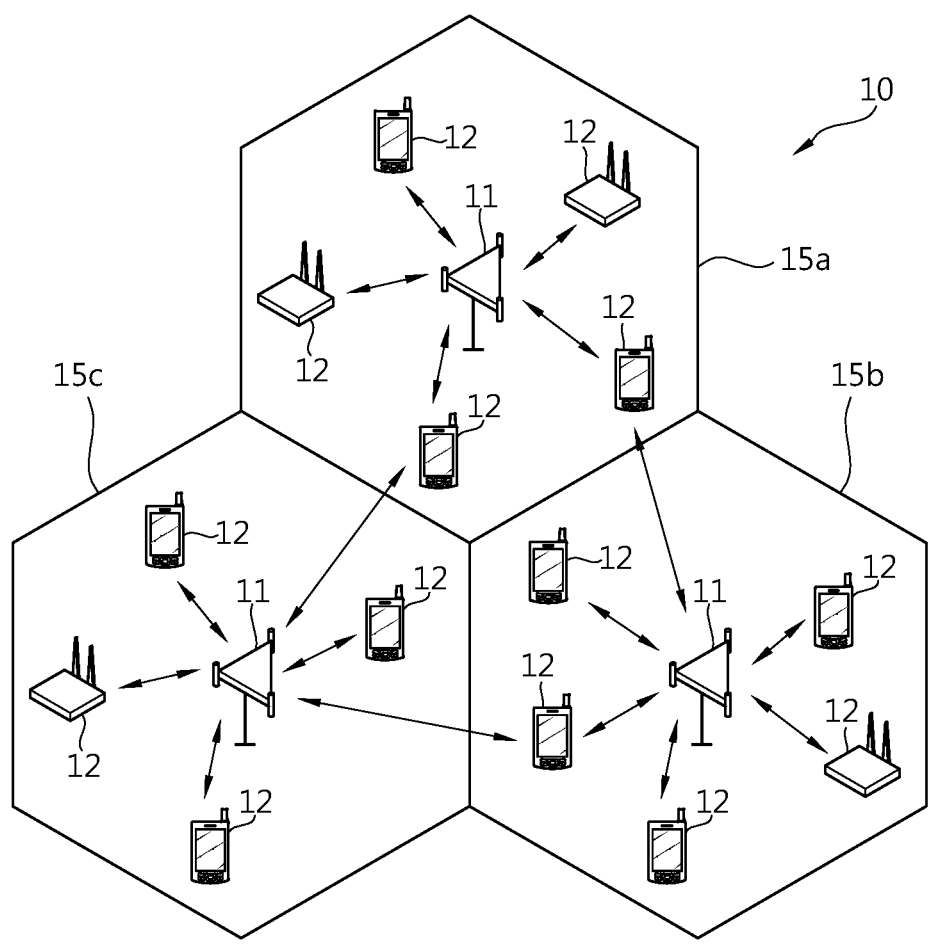
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
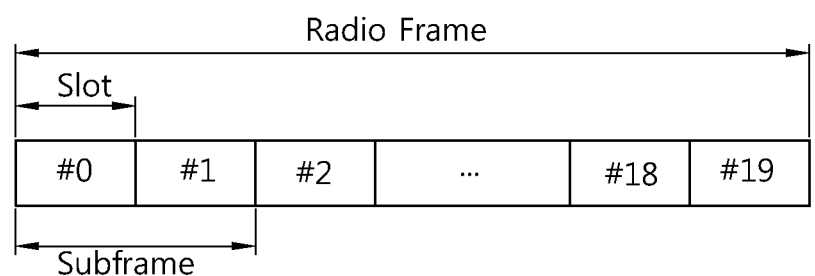
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the LTE can be simultaneously performed. In a TDD system in which an uplink transmission and a downlink transmission are discriminated in units of subframes, the uplink transmission and the downlink transmission are performed in different subframes.

Figure 3:
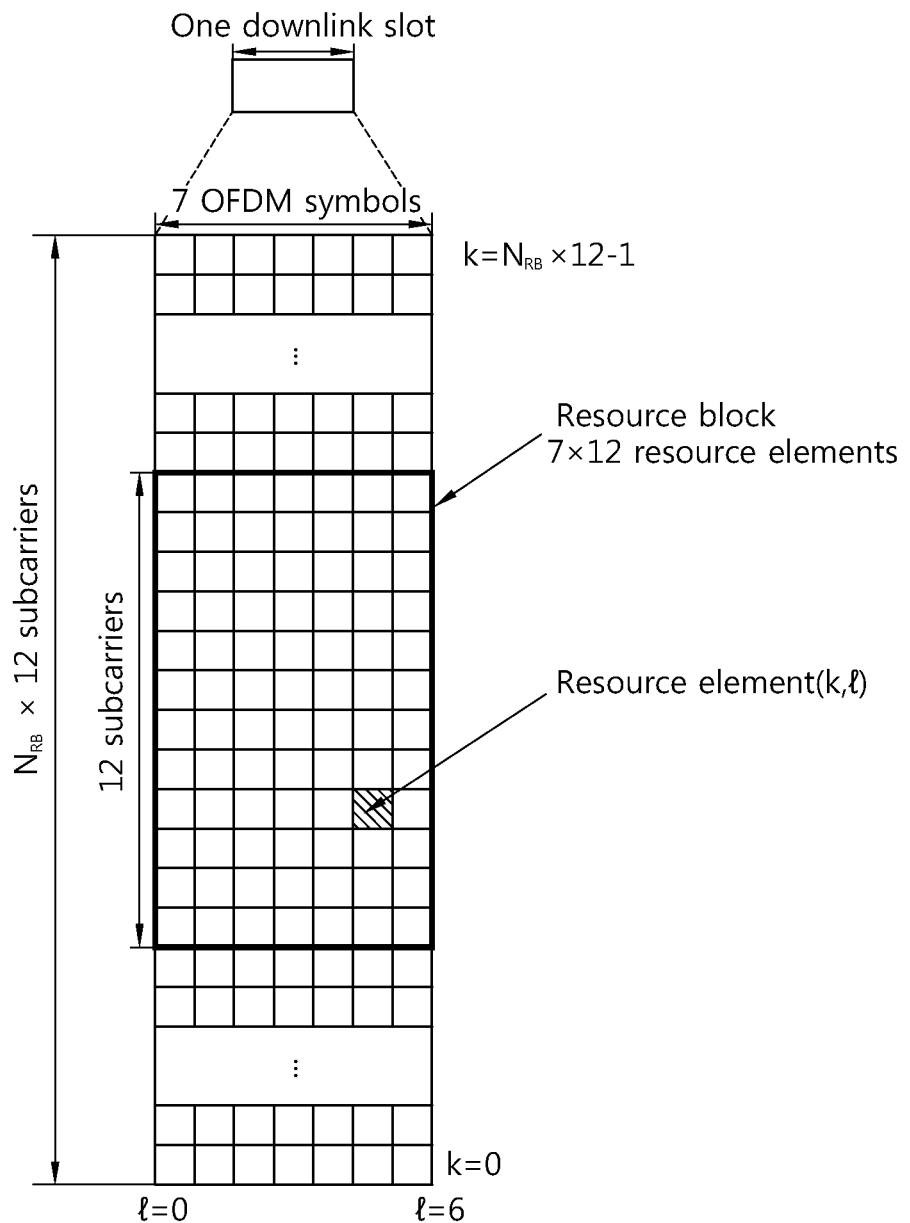
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
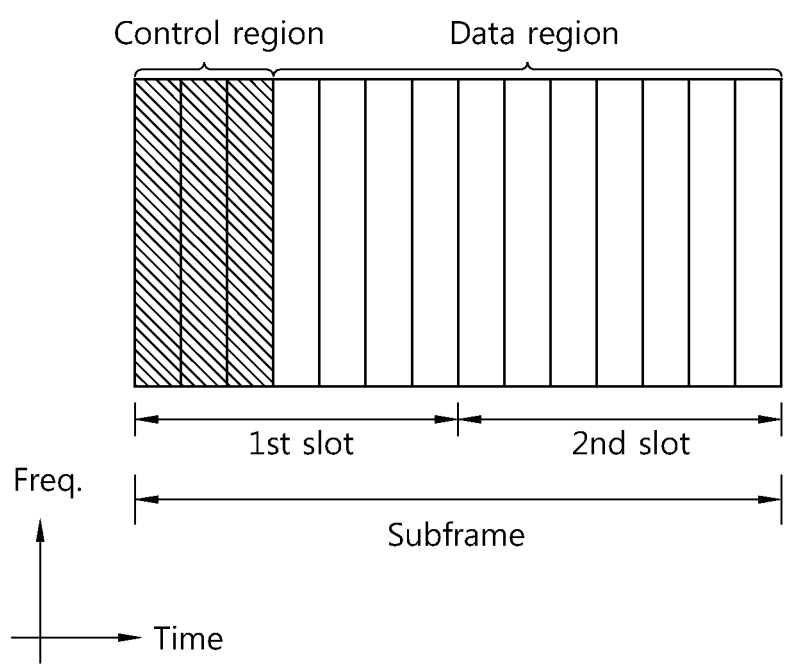
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
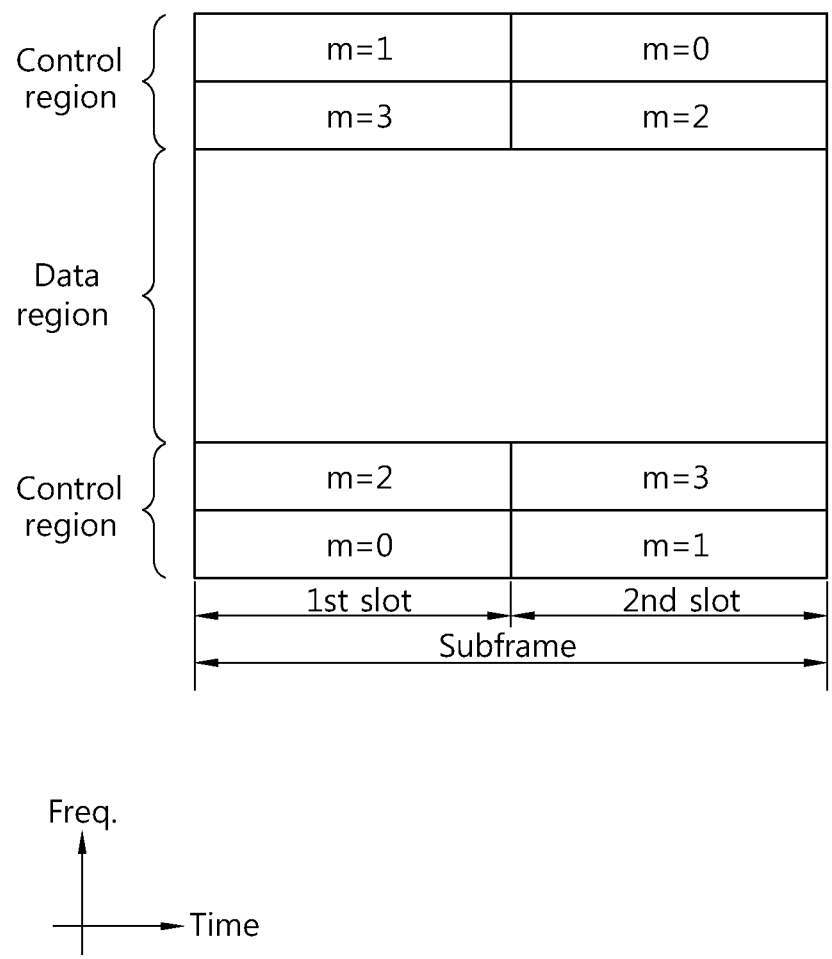
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
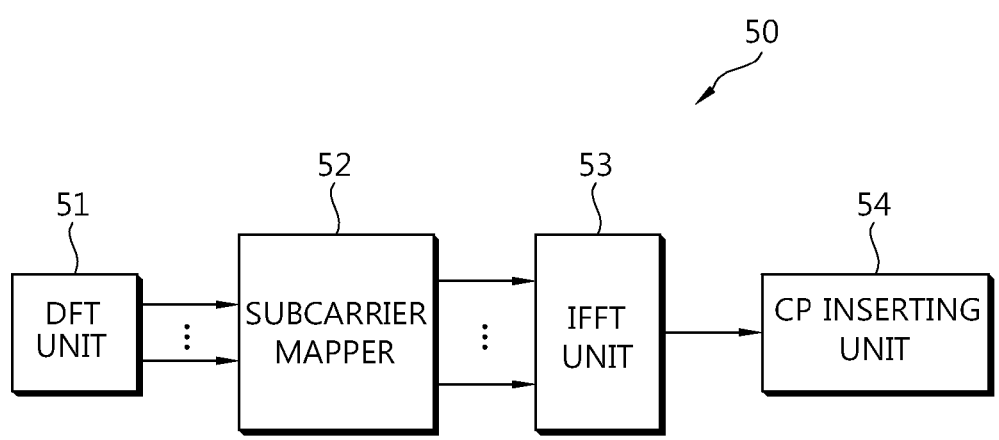
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 7:
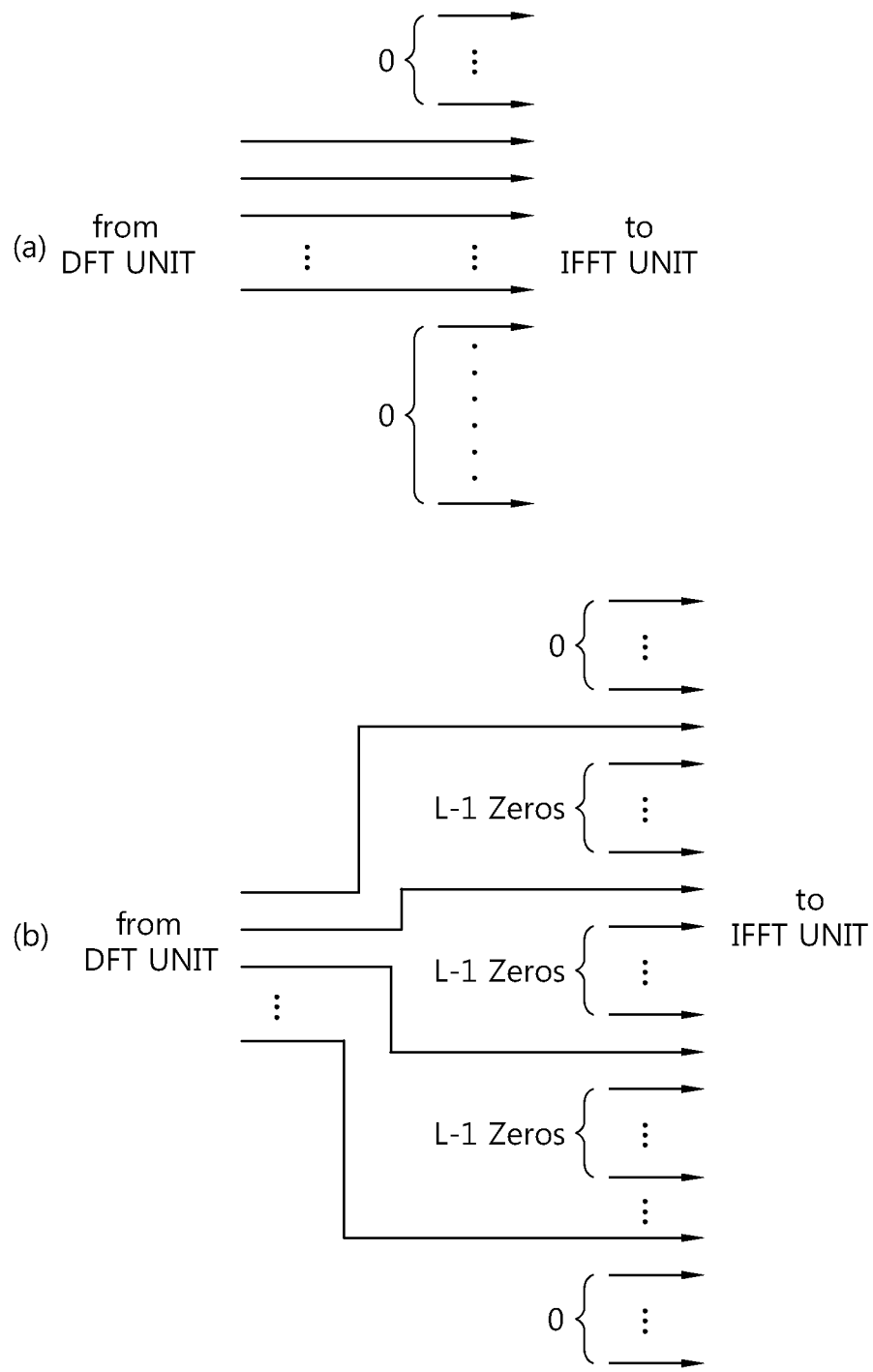
FIG. 7 shows an example of a scheme in which the subcarrier mapper maps the complex-valued symbols to the respective subcarriers of the frequency domain.

FIG. 7 shows an example of a scheme in which the subcarrier mapper maps the complex-valued symbols to the respective subcarriers of the frequency domain. Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L-1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 7(b), a single carrier characteristic is maintained.

FIG. 8 shows an example of the structure of a reference signal transmitter for demodulation.

Referring to FIG. 8, the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

Figure 9:
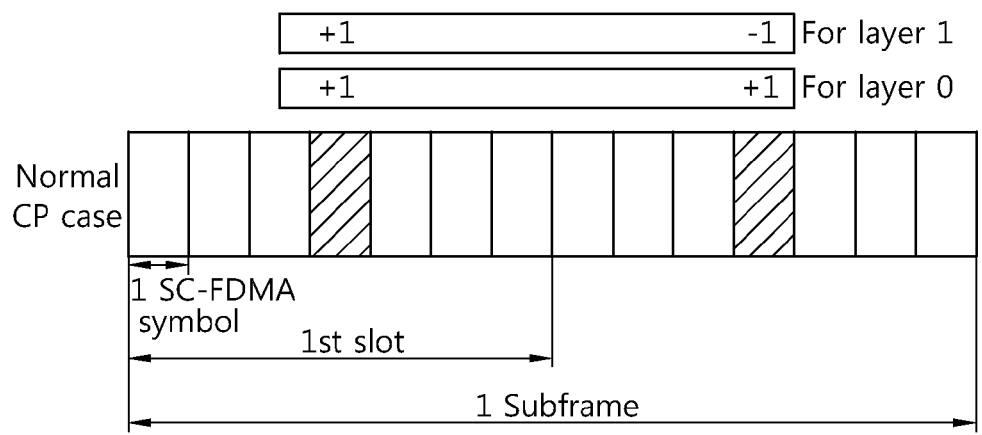
FIG. 9 shows examples of a subframe through which a reference signal is transmitted.

FIG. 9 shows examples of a subframe through which a reference signal is transmitted. The structure of a subframe in FIG. 9(a) shows a case of a normal CP. The subframe includes a first slot and a second slot. Each of the first slot and the second slot includes 7 OFDM symbols. The 14 OFDM symbols within the subframe are assigned respective symbol indices 0 to 13. Reference signals may be transmitted through the OFDM symbols having the symbol indices 3 and 10. The reference signals may be transmitted using a sequence. A Zadoff-Chu (ZC) sequence may be used as the reference signal sequence. A variety of ZC sequences may be generated according to a root index and a cyclic shift value. A BS may estimate the channels of a plurality of UEs through an orthogonal sequence or a quasi-orthogonal sequence by allocating different cyclic shift values to the UEs. The positions of the reference signals occupied in the two slots within the subframe in the frequency domain may be identical with each other or different from each other. In the two slots, the same reference signal sequence is used. Data may be transmitted through the remaining SC-FDMA symbols other than the SC-FDMA symbols through which the reference signals are transmitted. The structure of a subframe in FIG. 9(b) shows a case of an extended CP. The subframe includes a first slot and a second slot. Each of the first slot and the second slot includes 6 SC-FDMA symbols. The 12 SC-FDMA symbols within the subframe are assigned symbol indices 0 to 11. Reference signals are transmitted through the SC-FDMA symbols having the symbol indices 2 and 8. Data is transmitted through the remaining SC-FDMA symbols other than the SC-FDMA symbols through which the reference signals are transmitted.

Although not shown in FIG. 9, a sounding reference signal (SRS) may be transmitted through the OFDM symbols within the subframe. The SRS is a reference signal for UL scheduling which is transmitted from UE to a BS. The BS estimates a UL channel through the received SRS and uses the estimated UL channel in UL scheduling.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 10:
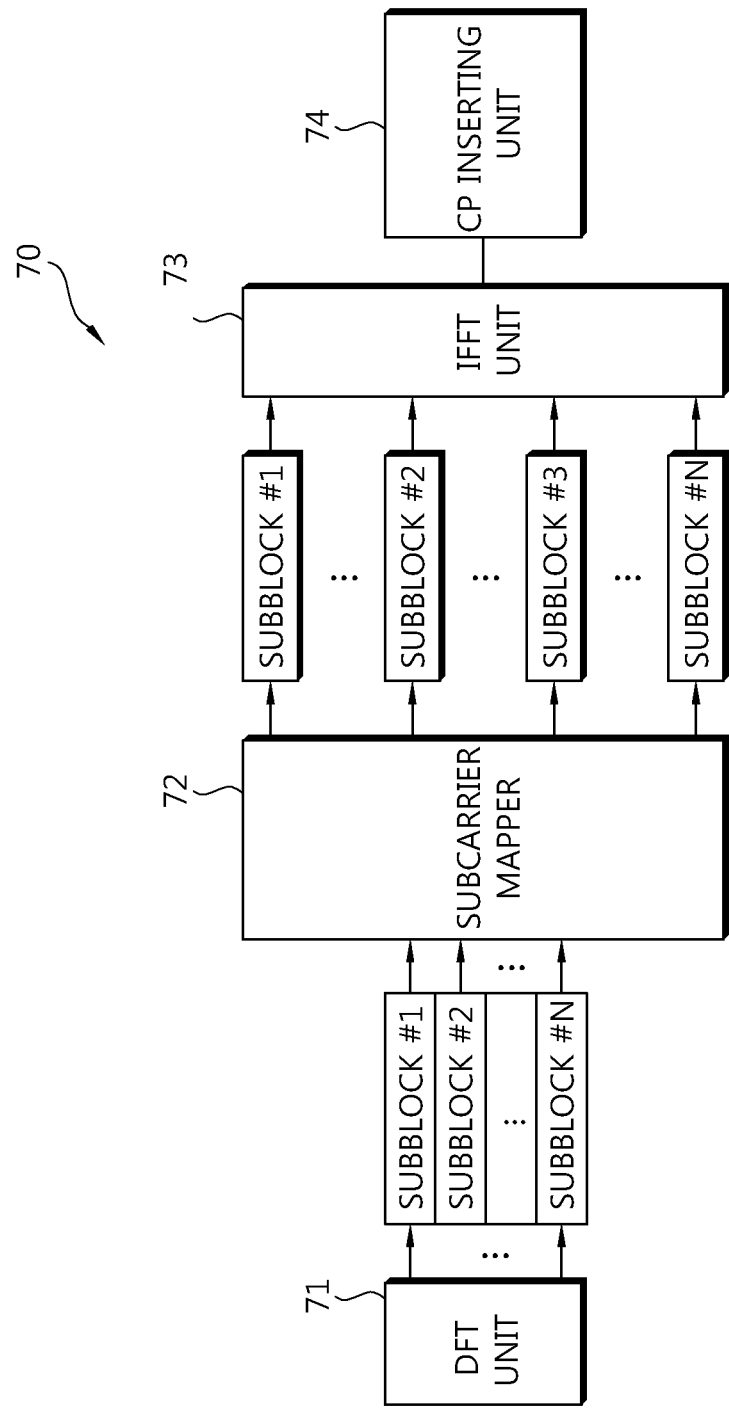
FIG. 10 shows an example of a transmitter using the clustered DFT-s OFDM transmission scheme.

FIG. 10 shows an example of a transmitter using the clustered DFT-s OFDM transmission scheme. Referring to FIG. 10, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 10 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 11:
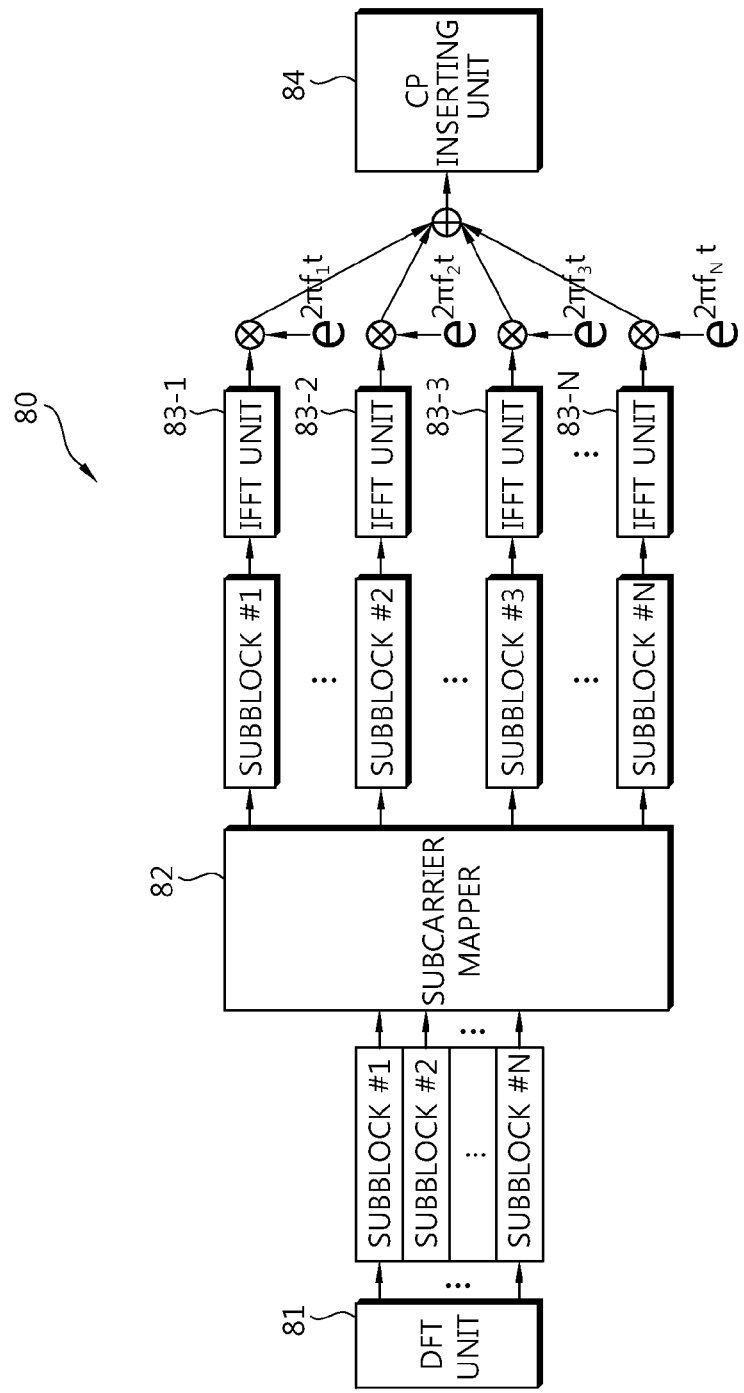
FIG. 11 shows another example of a transmitter using the clustered DFT-s OFDM transmission scheme.

FIG. 11 shows another example of a transmitter using the clustered DFT-s OFDM transmission scheme. Referring to FIG. 11, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An $n^{th}$ IFFT unit 38-$n$ outputs an $n^{th}$ baseband signal (n=1, 2, ..., N) by performing IFFT on a subblock #n. The $n^{th}$ baseband signal is multiplied by an $n^{th}$ carrier signal to produce an $n^{th}$ radio signal. After the N radio signals generated from the N subblocks are added, a CP is inserted by the CP insertion unit 314. The transmitter 80 of FIG. 11 may be used in a discontiguous carrier allocation situation where carriers allocated to the transmitter are not contiguous to each other.

Figure 12:
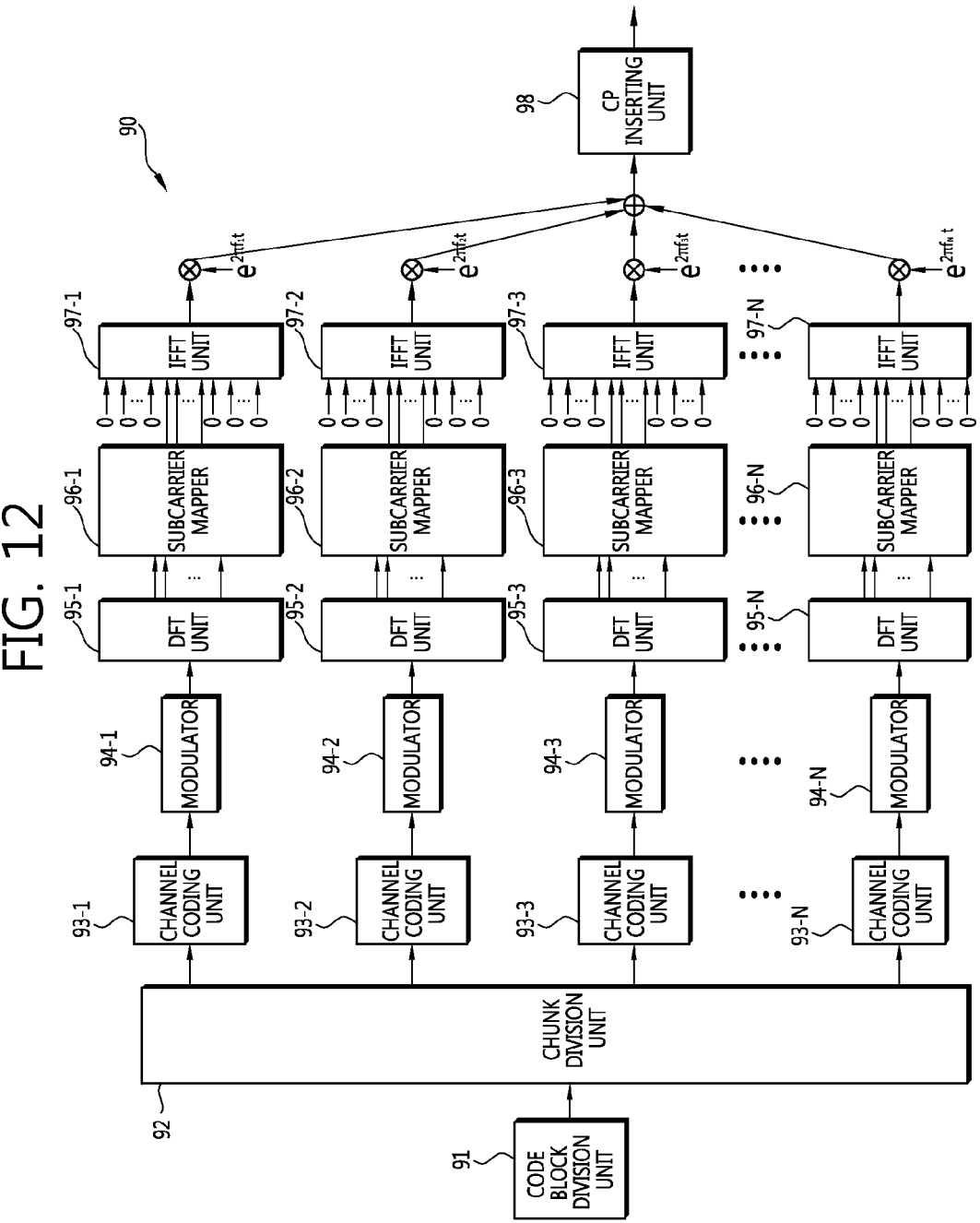
FIG. 12 is another example of a transmitter using the clustered DFT-s OFDM transmission scheme.

FIG. 12 is another example of a transmitter using the clustered DFT-s OFDM transmission scheme. FIG. 12 is a chunk-specific DFT-s OFDM system performing DFT precoding on a chunk basis. This may be called Nx SC-FDMA. Referring to FIG. 12, the transmitter 90 includes a code block division unit 91, a chunk division unit 92, a plurality of channel coding units 93-1, ..., 93-N, a plurality of modulators 94-1, ..., 4914-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontiguous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift $\alpha$ according to Equation 2.

$$r_{u,v}^{(\alpha)}(n) = e^{j\alpha n} b_{u,v}(n), \ 0 \leq n < M_{sc}^{RS} \quad \text{[Equation 2]}$$

In Equation 2, $M_{sc}^{RS}$ ($1 \leq m \leq N_{RB}^{max,UL}$) is the length of the reference signal sequence and $M_{sc}^{RS} = m \cdot N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one basic sequence.

A basic sequence $b_{u,v}(n)$ is divided into a plurality of groups. Here, $u \in \{0,1,\ldots,29\}$ indicates a group index, and $v$ indicates a basic sequence index within the group. The basic sequence depends on the length $M_{sc}^{RS}$ of the basic sequence. Each group includes a basic sequence ($v=0$) having a length of $M_{sc}^{RS}$ for m ($1 \leq m \leq 5$) and includes 2 basic sequences ($v=0,1$) having a length of $M_{sc}^{RS}$ for m ($6 \leq m \leq n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 3.

$$b_{u,v}(n) = x_q(n \bmod N_{ZC}^{RS}), \ 0 \leq n < M_{sc}^{RS} \quad \text{[Equation 3]}$$

In Equation 3, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 4.

$$x_q(m) = e^{-j\frac{\pi q m(m+1)}{N_{ZC}^{RS}}}, \ 0 \leq m \leq N_{ZC}^{RS} - 1 \quad \text{[Equation 4]}$$

q may be given by Equation 5.

$$q = \lfloor \bar{q} + 1/2 \rfloor + v \cdot (-1)^{\lfloor 2\bar{q} \rfloor} \quad \text{[Equation 5]}$$

$$\bar{q} = N_{ZC}^{RS} \cdot (u+1)/31$$

If the length of the reference signal sequence is $3N_{sc}^{RB}$ or less, the basic sequence may be defined by Equation 6.

$$b_{u,v}(n) = e^{j\phi(n)\pi/4}, \ 0 \leq n \leq M_{sc}^{RS} - 1 \quad \text{[Equation 6]}$$

Table 1 is an example where $\phi(n)$ is defined when $M_{sc}^{RS} = N_{sc}^{RB}$.

TABLE 1

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 3 | −3 | 1 | 1 | 1 | 1 | 3 | −3 | 3 |
| 18 | −3 | 3 | 1 | 3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

Table 2 is an example were $\phi(n)$ is defined when $M_{sc}^{RS} = 2 \cdot N_{sc}^{RB}$.

TABLE 2

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |

TABLE 2-continued $\phi(0), \ldots, \phi(23)$

| | | | | | | | | | | | | | | | | | | | | | | | | |
|---|---|---|---|---|---|---|---|---|---|---|---|---|---|---|---|---|---|---|---|---|---|---|---|---|
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 1 | 1 | −3 | 1 | −3 | 1 | 1 | −3 | −1 | −1 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 7.

$$u = (f_{gh}(n_s) + f_{ss}) \bmod 30 \quad \text{[Equation 7]}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 8.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases} \quad \text{[Equation 8]}$$

In Equation 8, c(i) is a pseudo random sequence that is a PN sequence and may be defined by a Gold sequence of a length-31. Equation 9 shows an example of a gold sequence c(n).

$$c(n) = (x_1(n+N_c) + x_2(n+N_c)) \bmod 2 \quad \text{[Equation 9]}$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH} = N_{ID}^{cell} \bmod 30$. The sequence shift pattern of the PUSCH may be $f_{ss}^{PUSCH} = (f_{ss}^{PUCCH} + \Delta_{ss}) \bmod 30$ and $\Delta_{ss} \in \{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index $n_s$ may be defined by Equation 10.

$$v = \begin{cases} c(n_s) & \text{if group hopping is disabled and sequence hopping in enabled} \\ 0 & \text{otherwise} \end{cases} \quad \text{[Equation 10]}$$

c(i) may be represented by an example of Equation 9. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 11.

$$r^{PUSCH}(m \cdot M_{sc}^{RS} + n) = r_{u,v}^{(\alpha)}(n) \quad \text{[Equation 11]}$$

In Equation 11, m=0,1, . . . and n=0, . . . , $M_{sc}^{RS}$−1. $M_{sc}^{RS} = M_{sc}^{PUSCH}$.

$\alpha = 2\pi n_{sc}/12$, that is, a cyclic shift value is given within a slot, and $n_{cs}$ may be defined by Equation 12.

$$n_{cs} = (n_{DMRS}^{(1)} + n_{DMRS}^{(2)} + n_{PRS}(n_s)) \bmod 12 \quad \text{[Equation 12]}$$

In Equation 12, $n_{DMRS}^{(1)}$ is indicated by a parameter transmitted by a higher layer, and Table 3 shows an example of a corresponding relationship between the parameter and $n_{DMRS}^{(1)}$.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 13.

$$n_{PRS}(n_s) = \Sigma_{i=0}^{7} c(8N_{symb}^{UL} \cdot n_s + i) \cdot 2^i \quad \text{[Equation 13]}$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

An SRS sequence $r_{SRS}(n) = r_{u,v}^{(\alpha)}(n)$ is defined. u indicates a PUCCH sequence group index, and v indicates a basic sequence index. The cyclic shift value $\alpha$ is defined by Equation 14.

$$\alpha = 2\pi \frac{n_{SRS}^{cs}}{8} \quad \text{[Equation 14]}$$

$n_{SRS}^{cs}$ is a value configured by a higher layer in related to each UE and may be any one of integers from 0 to 7.

A proposed method of generating a reference signal sequence is described below.

As described above, whether to perform a group hopping (GH) on a reference signal sequence in LTE rel-8 may be indicated by a signal that is transmitted in a cell-specific way. The cell-specific signal indicating whether to perform the group hopping on a reference signal sequence is hereinafter called a cell-specific GH parameter. Although LTE rel-8 UE and LTE-A UE coexist within a cell, whether to perform the group hopping on a reference signal sequence is the same in the LTE Rel-8 UE and the LTE-A UE. Currently defined group hopping or a sequence hopping (SH) may be performed on a unit of each slot. The cell-specific GH parameter may be a Group-hopping-enabled parameter provided by a higher layer. When the value of the Group-hopping-enabled parameter is true, the group hopping for a reference signal sequence is performed, but the sequence hopping is not performed. When the value of the Group-hopping-enabled parameter is false, the group hopping for a reference signal sequence is not performed, and whether to perform the sequence hopping is determined by a cell-specific SH parameter, provided by a higher layer and indicating whether to perform the sequence hopping. The cell-specific SH parameter may be a Sequence-hopping-enabled parameter provided by a higher layer.

Meanwhile, in the LTE-A, LTE rel-8 UE and LTE-A UE may perform MU-MIMO transmission, or LTE-A UEs may perform MU-MIMO transmission. Here, in order to support the MU-MIMO transmission of UEs having different bandwidths, the OCC may be applied. When the OCC is applied, orthogonality between the UEs performing the MU-MIMO transmission can be improved and the throughput can also be improved. However, if UEs have different bandwidths and whether to perform the group hopping or the sequence hopping for a reference signal sequence is determined by a cell-specific GH parameter or a cell-specific SH parameter defined in LTE rel-8, orthogonality between reference signals transmitted by the respective UEs may not be sufficiently guaranteed.

FIG. 13 is an example where a plurality of UEs performs MU-MIMO transmission using different bandwidths. In FIG. 13(a), a first UE UE1 and a second UE UE2 perform the same bandwidth. In this case, whether to perform the group hopping or the sequence hopping for a base sequence of a reference signal may be determined by a cell-specific GH parameter or a cell-specific SH parameter defined in LTE rel-8. In FIG. 13(b), a first UE UE1 uses a bandwidth which is the sum of bandwidths used by a second UE UE2 and a third UE UE3. That is, the first UE, the second UE, and the third UE use different bandwidths. In this case, whether to perform the group hopping or the sequence hopping for a base sequence of a reference signal transmitted by each UE needs to be determined using a new method.

Accordingly, a user equipment-specific sequence group hopping (SGH) parameter may be newly defined, which determines whether to perform group hopping or sequence hopping on the base sequence of a reference signal that each user equipment transmits. Hereinafter, a case is described where whether to perform sequence hopping on the base sequence of a reference signal is determined by the user equipment-specific SGH parameter. As the user equipment-specific SGH parameter is information for a specific user equipment, they may be transmitted only to the specific user equipment. The user equipment-specific SGH parameters may be applied to a DMRS that is transmitted using PUSCH resources assigned to a specific user equipment. In other words, the user equipment-specific SGH parameter may indicate whether to perform sequence hopping on the base sequence of the DMRS transmitted using the PUSCH resources. For the convenience of description, it is defined that whether to perform sequence hopping on the base sequence of a reference signal is determined only by the user equipment-specific SGH parameters, but the invention is not limited to this. Whether to perform sequence hopping on the base sequence of a reference signal may also be determined by the user equipment-specific SH parameter other than the user equipment-specific SGH parameter. In addition, the invention describes that it is applied to the base sequence of DMRS transmitted using PUSCH resources, but the invention is not limited to this and may also be applied to DMRS, SRS, etc. that are transmitted using PUCCH resources. In addition, although the invention is based on an MU-MIMO environment where a plurality of user equipments has different bandwidths, it may also be applied to an MU-MIMO environment where the user equipments have the same bandwidth, or to a SU-MIMO environment.

When a value of the cell-specific OH parameter becomes false and group hopping is not performed on the base sequence of a reference signal, a value of the cell-specific SH parameter becomes true and sequence hopping may be performed on the base sequence of the reference signal. Then, sequence hopping in a slot level is performed on both DMRS that uses PUSCH resources, and DMRS and SRS that use PUCCH resources, in common. In other words, a base sequence index (or number) in a sequence group changes on a slot basis. Then, whether to perform sequence hopping on DMRS that uses PUSCH resources may be indicated by the user equipment-specific SGH parameter. In other words, the user equipment-specific SGH parameter overrides the cell-specific SH parameter. The user equipment-specific SGH parameter may be a Disable Sequence-group hopping parameter. In other words, if a value of the user equipment-specific SGH parameter becomes true, then sequence hopping is set not to be performed regardless of whether the value of the cell-specific SH parameter is true or false. More particularly, if the user equipment-specific SGH parameter value is true, then sequence hopping on the base sequence of a reference signal is set not to be performed even if an indication is made by the cell-specific SH parameter to perform sequence hopping on the base sequence of the reference signal. Since sequence hopping is not performed, the base sequence index of the base sequence of the reference signal does not change on a slot basis. Then, since sequence hopping is not performed only in one subframe, two slots in one subframe transmits the base sequence of the reference signal of the same base sequence index and sequence hopping may be applied between subframes. Alternatively, since sequence hopping is not applied to the entire subframes, all slots may also transmit the base sequence of the reference signal of the same base sequence index. Meanwhile, when the user equipment-specific SGH parameter value is false, then sequence hopping on the base sequence of a reference signal may be performed as indicated by the cell-specific SH parameter.

Figure 14:
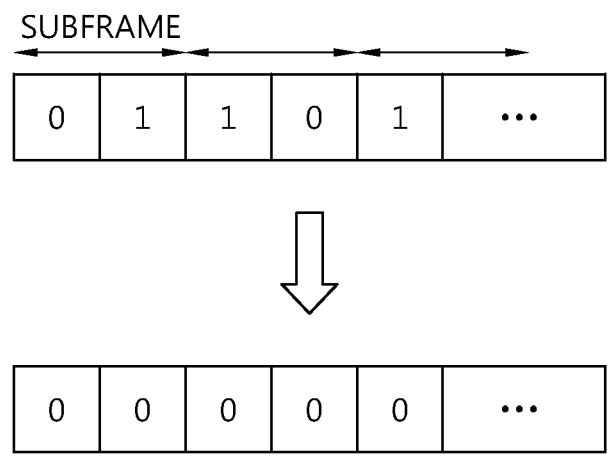
FIG. 14 shows an example where sequence hopping is not performed by a user equipment-specific SGH parameter according to an embodiment of the present invention.

FIG. 14 shows an example where sequence hopping is not performed by a user equipment-specific SGH parameter according to an embodiment of the present invention. Referring to FIG. 14, when sequence hopping is performed at LTE rel-8 or 9, the base sequence indices of the base sequences of reference signals transmitted from each slot are different from one another. Then, the base sequence index of the base sequence of a reference signal may be determined by Equation 10 previously described. If sequence hopping is not performed by a user equipment-specific SGH parameter, then zeros may be assigned to all the base sequence indices of the base sequences of the reference signals transmitted from each slot are all.

Figure 15:
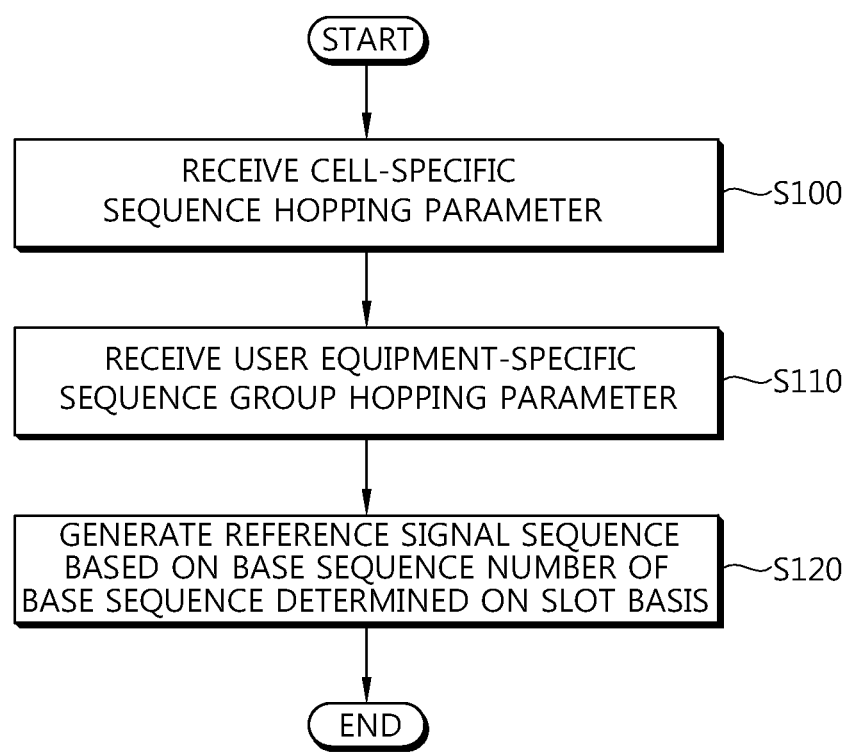
FIG. 15 shows an example of a method of generating a reference signal sequence according to an embodiment of the present invention.

FIG. 15 shows an example of a method of generating a reference signal sequence according to an embodiment of the present invention.

At step S100, a user equipment receives a cell-specific SH parameter from a base station. At step S110, the user equipment receives a user equipment-specific SGH parameter from the base station. The user equipment-specific SGH parameter may be given by a higher layer. At step S120, the user equipment generates a reference signal sequence based on a base sequence number of a base sequence determined on a slot basis. Then, whether to apply the sequence hopping of the base sequence number indicated by the user equipment-specific SGH parameter overrides whether to apply the sequence hopping of the base sequence number indicated by the cell-specific SH parameter.

Whether to perform sequence hopping by the user equipment-specific SGH parameter may be known to a user equipment by various ways described below.

1) A frequency hopping flag included in a DCI format for uplink transmission may function as the user equipment-specific SGH parameter. For example, if frequency hopping is enabled by the frequency hopping flag, then sequence hopping may be performed in a slot level. In addition, if frequency hopping is disabled by the frequency hopping flag, sequence hopping may not be performed on the base sequence of DMRS that uses PUSCH resources. Alternatively, sequence hopping may be performed on a subframe basis.

2) Whether to perform sequence hopping may be indicated by masking information representing whether to perform SGH and SH on the base sequence of a reference signal to a bit representing UE ID that is included in the DCI format.

3) When the specific index of a cyclic shift indicator included in the DCI format for uplink transmission has been designated, whether to perform sequence hopping on the base sequence of a reference signal may be indicated.

4) The DCI format for uplink transmission may include a user equipment-specific SGH parameter that indicates whether to perform the sequence hopping of the base sequence of the reference signal.

5) The user equipment-specific SGH parameter may be transmitted to a user equipment by higher layer signaling for a specific user equipment.

6) If a clustered DFT-s OFDM transmission scheme is used, then sequence hopping may not be performed on the base sequence of the reference signal.

Although it has been described above that whether to perform sequence hopping on the base sequence of the reference signal is determined by the user equipment-specific SGH parameter, a parameter may be newly defined, which indicates whether to further perform SH to further guarantee the orthogonality of the reference signals between user equipments in an MU-MIMO environment. The new parameter that indicates whether to perform SH may be a user equipment-specific SH parameter. The user equipment-specific SH parameter may be applied in the same way as the user equipment-specific SGH parameter previously described. In other words, the user equipment-specific SH parameter may override a cell-specific SH parameter when being applied. Then, the user equipment-specific SGH parameter previously described may determine only whether to perform group hopping. In other words, when a value of the user equipment-specific SGH parameter is true, then grouping hopping on the base sequence of a reference signal is not performed. In addition, whether to perform sequence hopping on the base sequence of the reference signal is determined by the user equipment-specific SH parameter. If a value of the user equipment-specific SH parameter is true, then sequence hopping is not performed on the base sequence of the reference signal. If a value of the user equipment-specific SH parameter is false, then whether to perform sequence hopping on the base sequence of the reference signal may be determined by the cell-specific SH parameter. Dynamic signaling, such as signaling through PDCCH may be given to the user equipment-specific SH parameter, implicitly or explicitly. Alternatively, RRC signaling may be given to the parameter by a higher layer, implicitly or explicitly.

Meanwhile, although it is assumed in the description above that when being applied, a user equipment-specific SGH parameter or a user equipment-specific SH parameter overrides a cell-specific SH parameter regardless of an uplink transmission mode, it may vary depending on a transmission mode. Single antenna transmission mode is basically supported in LTE rel-8/9, but a multiple antenna transmission mode, a transmission mode for supporting non-contiguous allocation, etc. may be defined for efficiency of uplink transmission in LTE-A. When being applied, whether to override the user equipment-specific SGH parameter or the user equipment-specific SH parameter may be determined depending on the transmission mode. For example, even if the user equipment-specific SGH parameter overrides the cell-specific SH parameter in single antenna transmission mode, whether to perform sequence hopping on the base sequence of a reference signal may be determined by the cell-specific SH parameter, without considering that.

Figure 16:
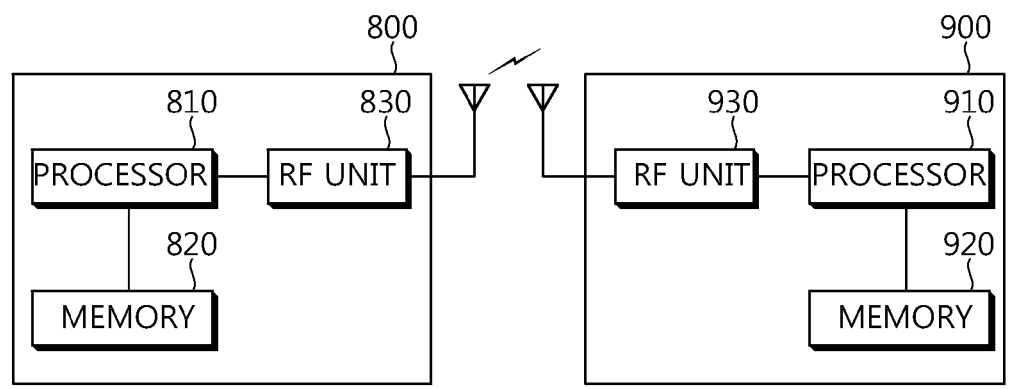
FIG. 16 is a block diagram illustrating a wireless communication system where an embodiment of the present invention is implemented.

FIG. 16 is a block diagram illustrating a wireless communication system where an embodiment of the present invention is implemented.

A base station 800 includes a processor 810, a memory 820, and a radio frequency (RF) unit 830. The processor implements functions, processes and/or methods proposed. The layers of a wireless interface protocol may be implemented by the processor 810. The memory 820 is connected to the processor 810 and stores various pieces of information for driving the processor 810. The RF unit 830 is connected to the processor 810, and transmits/receives radio signals.

A user equipment 900 includes a processor 910, a memory 920, and an RF unit 930. The processor 910 implements functions, processes, and/or methods proposed. The layers of a wireless interface protocol may be implemented by the processor 910. The processor 910 is configured to generate a reference signal sequence based on a base sequence on a slot basis. The processor receives the cell-specific SH parameter from the base station, receives the user equipment-specific SGH parameter that are specific to the user equipments, from the base station, and generates a reference signal sequence based on a base sequence number of a base sequence determined on a unit of each slot based on the cell-specific SH parameter and the user equipment-specific SGH parameter. At this point, whether to apply the sequence hopping of the base sequence number indicated by the user equipment-specific SGH parameter overrides whether to apply the sequence hopping of the base sequence number indicated by the cell-specific SH parameters. The memory 920 is connected to the processor 910 and stores various pieces of information for driving the processor 910. The RF unit 930 is connected to the processor 910, and transmits/receives radio signals.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of receiving, by a base station, a reference signal in a wireless communication system, the method comprising:
   transmitting a cell-specific group hopping parameter to a plurality of user equipments (UEs) in a cell, wherein the cell-specific group hopping parameter is used to disable a group hopping for the plurality of UEs in the cell;
   transmitting a cell-specific sequence hopping parameter to the plurality of UEs in the cell, wherein the cell-specific sequence hopping parameter is used to enable a sequence hopping for the plurality of UEs in the cell;
   transmitting a UE-specific sequence group hopping (SGH) parameter to a certain UE, among the plurality of UEs, wherein the UE-specific SGH parameter is used to disable the sequence hopping, enabled by the cell-specific sequence hopping parameter, for the certain UE; and
   receiving a reference signal, which is generated based on a base sequence number within a base sequence group, wherein the base sequence number within the base sequence group is determined by the UE-specific SGH parameter.

2. The method of claim 1, wherein the cell-specific sequence group hopping parameter is a Group-hopping-enabled parameter transmitted through a high layer.

3. The method of claim 1, wherein the cell-specific sequence hopping parameter is a Sequence-hopping-enabled parameter transmitted through a high layer.

4. The method of claim 1, wherein the UE-specific SGH parameter is a Disable-sequence-group-hopping parameter transmitted through a high layer.

5. The method of claim 1, wherein the base sequence number within the base sequence group in each slot is identical.

6. The method of claim 5, wherein the base sequence number within the base sequence group in each slot is set to 0 according to the UE-specific SGH parameter.

7. The method of claim 1, wherein a length of the reference signal is longer than $6N_{sc}^{RB}$, where the $N_{sc}^{RB}$ is a size of a resource block indicated by a number of subcarriers in a frequency domain.

8. A base station comprising:
a radio frequency (RF) unit; and
a processor coupled to the RF unit, and configured to:
control the RF unit to transmit a cell-specific group hopping parameter to a plurality of user equipments (UEs) in a cell, wherein the cell-specific group hopping parameter is used to disable a group hopping for the plurality of UEs in the cell,
control the RF unit to transmit a cell-specific sequence hopping parameter to the plurality of UEs in the cell, wherein the cell-specific sequence hopping parameter is used to enable a sequence hopping for the plurality of UEs in the cell,
control the RF unit to transmit a UE-specific sequence group hopping (SGH) parameter to a certain UE, among the plurality of UEs, wherein the UE-specific SGH parameter is used to disable the sequence hopping, enabled by the cell-specific sequence hopping parameter, for the certain UE, and
control the RF unit to receive a reference signal, which is generated based on a base sequence number within a base sequence group, wherein the base sequence number within the base sequence group is determined by the UE-specific SGH parameter.

9. The base station of claim 8, wherein the cell-specific sequence group hopping parameter is a Group-hopping-enabled parameter transmitted through a high layer.

10. The base station of claim 8, wherein the cell-specific sequence hopping parameter is a Sequence-hopping-enabled parameter transmitted through a high layer.

11. The base station of claim 8, wherein the UE-specific SGH parameter is a Disable-sequence-group-hopping parameter transmitted through a high layer.

12. The base station of claim 8, wherein the base sequence number within the base sequence group in each slot is identical.

13. The base station of claim 12, wherein the base sequence number within the base sequence group in each slot is set to 0 according to the UE-specific SGH parameter.

14. The base station of claim 8, wherein a length of the reference signal is longer than $6N_{sc}^{RB}$, where the $N_{sc}^{RB}$ is a size of a resource block indicated by a number of subcarriers in a frequency domain.

* * * * *